(12) United States Patent
Siebeking et al.

(10) Patent No.: US 11,138,206 B2
(45) Date of Patent: Oct. 5, 2021

(54) UNIFIED METADATA MODEL TRANSLATION FRAMEWORK

(71) Applicant: SAP SE, Walldorf (DE)

(72) Inventors: Ingo Siebeking, Heidelberg (DE); Andreas Balzar, Bad Schoenborn (DE); Gerald Krause, Bensheim (DE); Jan Teichmann, Neustadt/Weinstrasse (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 16/225,742

(22) Filed: Dec. 19, 2018

(65) Prior Publication Data

US 2020/0201865 A1 Jun. 25, 2020

(51) Int. Cl.
   *G06F 16/2457* (2019.01)
   *G06F 16/84* (2019.01)
   *G06F 16/2455* (2019.01)
   *G06F 16/907* (2019.01)

(52) U.S. Cl.
   CPC .... *G06F 16/24573* (2019.01); *G06F 16/2456* (2019.01); *G06F 16/84* (2019.01); *G06F 16/907* (2019.01)

(58) Field of Classification Search
   CPC .. G06F 16/24573; G06F 16/907; G06F 16/84; G06F 16/2456
   USPC ......................................................... 707/769
   See application file for complete search history.

(56) References Cited

U.S. PATENT DOCUMENTS 6,523,172 B1 * 2/2003 Martinez-Guerra .... G06F 8/427 704/9
7,350,033 B2 3/2008 Hofmann et al.
7,509,301 B2 3/2009 Schmitt et al.
7,653,661 B2 1/2010 Razvi et al.
7,844,659 B2 11/2010 Baeuerle et al.
(Continued)

OTHER PUBLICATIONS

CDS Annotations, SAP Help Portal, SAP HANA Platform, retrieved from: https://help.sap.com/viewer/ 09b6623836854766b682356393c6c416/2.0.02/en-US/ 8217aac86d9748d8b034797ecc8065b6.html, at least as early as Dec. 19, 2018, 5 pages.

(Continued)

*Primary Examiner* — Ashish Thomas
*Assistant Examiner* — Nargis Sultana
(74) *Attorney, Agent, or Firm* — Klarquist Sparkman, LLP

(57) ABSTRACT

Techniques and solutions are described for transferring metadata between software applications. A translation framework stores metadata models in a standard format. Source applications can cause metadata models to be stored in the translation framework in the standard format. A target application can receive metadata models, or elements thereof, from the translation framework, which metadata models can be optionally converted from the standard format to a target format used by the target application. The translation framework can store annotations to a metadata model in the form of custom metadata types. The custom metadata types can be used by one or both of the target application and a source application. Source applications can cause values to be stored for annotations they support. Target applications can read values for annotations they support. Source applications and target applications do not write or read, respectively, unsupported annotations.

20 Claims, 14 Drawing Sheets

(56) References Cited

U.S. PATENT DOCUMENTS

| | | | |
|---|---|---|---|
| 7,904,469 B2* | 3/2011 | Dettinger | G06F 16/24573 |
| | | | 707/769 |
| 8,255,245 B2 | 8/2012 | Krause et al. | |
| 8,484,259 B1* | 7/2013 | Makkar | G06F 16/90335 |
| | | | 707/827 |
| 8,555,241 B2 | 10/2013 | Teichmann et al. | |
| 8,612,285 B2 | 12/2013 | Nos et al. | |
| 8,612,927 B2 | 12/2013 | Brunswig et al. | |
| 8,627,321 B2 | 1/2014 | Teichmann et al. | |
| 8,661,462 B2 | 2/2014 | Kriebel et al. | |
| 8,688,507 B2 | 4/2014 | Kennis et al. | |
| 8,719,224 B2 | 5/2014 | Pfeifer et al. | |
| 8,741,437 B2 | 6/2014 | Teichmann et al. | |
| 8,796,272 B2 | 7/2014 | Teichmann et al. | |
| 8,825,630 B2* | 9/2014 | Walter | G06F 16/972 |
| | | | 707/713 |
| 8,874,601 B2 | 10/2014 | Hermanns et al. | |
| 8,892,667 B2 | 11/2014 | Brunswig et al. | |
| 9,171,039 B2 | 10/2015 | Teichmann et al. | |
| 9,508,048 B2 | 11/2016 | Said et al. | |
| 10,192,202 B2* | 1/2019 | Stuhec | H04L 51/063 |
| 10,282,360 B2 | 5/2019 | Krause et al. | |
| 2005/0021543 A1 | 1/2005 | Schmitt et al. | |
| 2005/0027675 A1 | 2/2005 | Schmitt et al. | |
| 2006/0004700 A1 | 1/2006 | Hofmann et al. | |
| 2007/0118540 A1* | 5/2007 | Guo | G06F 16/58 |
| 2007/0233778 A1 | 10/2007 | Bauerle et al. | |
| 2008/0021758 A1 | 1/2008 | Teichmann et al. | |
| 2008/0162546 A1 | 7/2008 | Razvi et al. | |
| 2009/0024596 A1* | 1/2009 | Basso | G06F 16/48 |
| 2009/0083131 A1 | 3/2009 | Nos et al. | |
| 2009/0132304 A1 | 5/2009 | Krause et al. | |
| 2009/0144245 A1 | 6/2009 | Nos et al. | |
| 2009/0172003 A1 | 7/2009 | Jentsch et al. | |
| 2010/0058113 A1* | 3/2010 | Rapp | G06F 11/366 |
| | | | 714/38.14 |
| 2010/0082497 A1 | 4/2010 | Biesemann et al. | |
| 2010/0146510 A1 | 6/2010 | Teichmann et al. | |
| 2011/0078204 A1* | 3/2011 | Lotikar | G06F 16/258 |
| | | | 707/794 |
| 2011/0087708 A1 | 4/2011 | Teichmann et al. | |
| 2011/0307353 A1 | 12/2011 | Ringl et al. | |
| 2012/0047079 A1 | 2/2012 | Biesemann et al. | |
| 2012/0054754 A1 | 3/2012 | Teichmann et al. | |
| 2012/0084770 A1 | 4/2012 | Kriebel et al. | |
| 2012/0158797 A1 | 6/2012 | Hermanns et al. | |
| 2012/0166465 A1 | 6/2012 | Teichmann et al. | |
| 2012/0166620 A1 | 6/2012 | Said et al. | |
| 2013/0014080 A1 | 1/2013 | Brunswig et al. | |
| 2013/0086097 A1 | 4/2013 | Teichmann et al. | |
| 2013/0086174 A1 | 4/2013 | Brunswig et al. | |
| 2013/0166675 A1 | 6/2013 | Giebel et al. | |
| 2013/0338980 A1* | 12/2013 | Paul | G06Q 10/00 |
| | | | 703/6 |
| 2014/0006300 A1 | 1/2014 | Hetzer et al. | |
| 2014/0122411 A1 | 5/2014 | Teichmann et al. | |
| 2014/0244364 A1 | 8/2014 | Evers et al. | |
| 2014/0279839 A1 | 9/2014 | Balzar et al. | |
| 2015/0046309 A1 | 2/2015 | Peichl et al. | |
| 2015/0073964 A1 | 3/2015 | Peichl et al. | |
| 2015/0213129 A1* | 7/2015 | Pingree | G06F 16/83 |
| | | | 707/769 |
| 2015/0312259 A1* | 10/2015 | Alpha | H04L 63/0428 |
| | | | 726/4 |
| 2017/0097818 A1* | 4/2017 | Heine | G06F 16/214 |
| 2018/0329963 A1 | 11/2018 | Voutta et al. | |
| 2019/0042632 A1 | 2/2019 | Kraus et al. | |
| 2020/0034480 A1 | 1/2020 | Kazmaier et al. | |
| 2020/0090504 A1* | 3/2020 | Kadar | G08G 1/0112 |

OTHER PUBLICATIONS

SCDM_COMMON_DATA_MODEL, Core Schema Notation (CSN), SAP Documentation, retrieved from: https://www.consolut.com/en/s/sap-ides-access/d/s/doc/YD-SCDM_COMMON_DATA_MODEL/, at least as early as Dec. 19, 2018, 7 pages.

Core Data Services, Schema Notation (CSN), SAP, retrieved from: https://cap.cloud.sap/docs/cds/csn, at least as early as Dec. 19, 2018, 25 pages.

Daehn et al., "Hana Smart Data Integration—Overview," retrieved from: https://blogs.sap.com/2014/11/27/hana-sp9-data-provisioning-overview/, Nov. 27, 2014, 42 pages.

"SAP HANA Smart Data Access(1): A brief introduction to SDA," retrieved from: https://blogs.sap.com/2014/06/02/sap-hana-smart-data-access1-a-brief-introduction-to-sda/, Jun. 2, 2014, 13 pages.

"What is SAP Analytics Cloud?" Cipher, retrieved from https://www.cipherbsc.com/sap-analytics-cloud/, at least as early as Dec. 19, 2018, 15 pages.

Sharma, ABAP Core Data Services—Part 3(Virtual Data Model Types), retrieved from: https://blogs.sap.com/2017/10/09/abap-core-data-services-part-2virtual-data-model-types/, Oct. 9, 2017, 10 pages.

* cited by examiner

```
@Common.Label: "Settlement Unit"
@Analytics.visible: true
entity SettlementUnit{
    key companyCode: erpDataTypes.BUKRS;
    key exciseDutyTypeId:
edDataTypes.edTypeId;
        settlementUnit: erpDataTypes.UNIT;
        baseQuantityUnit: erpDataTypes.UNIT;
        volumeDecimalPlaces : Integer;
}
```
← 812

820 → (label annotation)
816 → (settlementUnit)

```
"ExciseDutyModel.SettlementUnit": {
    "kind": "entity",
    "@Analytics.visible": true,
    "@Common.Label": {
        "=": "Settlement Unit"
    },
    "@cds.persistence.name": "EXCISEDUTYMODEL_SETTLEMENTUNIT",
    "elements": {
        "companyCode": {
            "@cds.persistence.name": "COMPANYCODE",
            "key": true,
            "length": 4,
            "type": "cds.String"
        },
        "exciseDutyTypeId": {
            "@cds.persistence.name": "EXCISEDUTYTYPEID",
            "key": true,
            "length": 3,
            "type": "cds.String"
        },
        "settlementUnit": {
            "@cds.persistence.name": "SETTLEMENTUNIT",
            "length": 3,
            "type": "cds.String"
        },
        "baseQuantityUnit": {
            "@cds.persistence.name": "BASEQUANTITYUNIT",
            "length": 3,
            "type": "cds.String"
        },
        "volumeDecimalPlaces": {
            "@cds.persistence.name": "VOLUMEDECIMALPLACES",
            "type": "cds.Integer"
        }
    }
},
```

```
{
"logicalModelId" : "<String>",
"logicalModelName" : "<String>",
"objects" : [
{
"logicalObjectId" : "<String>",
"logicalObjectName" : "<String>",
"logicalModelId" : "<String>",
"packageName" : "<String>",
"objectType" : "< CALCULATIONVIEW | SQLVIEW | TABLE >",
"effectiveDated" : <Boolean>,
"fields" : [],
"effectiveDateFields" : {},
"expanded" : <Boolean>,
"relations" : [
{
"sourceLogicalObjectId" : "<String>",
"targetLogicalObjectId" : "<String>",
"targetLogicalObject" : {
"logicalObjectId" : "<String>",
"logicalObjectName" : "<String>",
"logicalModelId" : "<String>",
"packageName" : "<String>",
"objectType" : "<String>",
"effectiveDated" : <Boolean>,
"fields" : [],
"effectiveDateFields" : {},
"expanded" : <Boolean>,
"relations" : [],
"translations" : {}
},
"joinType" : "< LEFT_OUTER_JOIN | INNER_JOIN | RIGHT_OUTER_JOIN >",
"mappings" : [
{
"sourceFieldId" : "<String>",
"targetFieldId" : "<String>",
"operator" : "="
},
{
<field mapping...>
},
{
<field mapping...>
}
]
},
{
<relation ...>
},
{
<relation ...>
}
]
},
{
<logical object ...>
},
{
<logical object ...>
}
]
}
```

FIG. 9

```
{
"logicalModelId" : "succession_by_position",
"logicalModelName" : null,
"objects" : [
{
"logicalObjectId" : "incumbent",
"logicalObjectName" : "incumbent",
"logicalModelId" : "succession_by_position",
"packageName" : "ANAREALMSGP_SAC/succession_by_position",
"objectType" : "CALCULATIONVIEW",
"effectiveDated" : false,
"fields" : [],
"effectiveDateFields" : {},
"expanded" : true,
"relations" : [
{
"sourceLogicalObjectId" : "incumbent",
"targetLogicalObjectId" : "incumbent_courses",
"targetLogicalObject" : {
"logicalObjectId" : "incumbent_courses",
"logicalObjectName" : "incumbent_courses",
"logicalModelId" : "succession_by_position",
"packageName" : "ANAREALMSGP_SAC/succession_by_position",
"objectType" : "CALCULATIONVIEW",
"effectiveDated" : false,
"fields" : [],
"effectiveDateFields" : {},
"expanded" : true,
"relations" : [],
"translations" : {}
},
"joinType" : "LEFT_OUTER_JOIN",
"mappings" : [
{
"sourceFieldId" : "succession_by_position#incumbent#USERS_SYS_ID",
"targetFieldId" : "incumbent_courses_USERS_SYS_ID",
"operator" : "="
},
{
<field mapping...>
},
{
<field mapping...>
}
]
},
{
<relation ...>
},
{
<relation ...>
}
]
},
{
<logical object ...>
},
{
<logical object ...>
```

FIG. 10

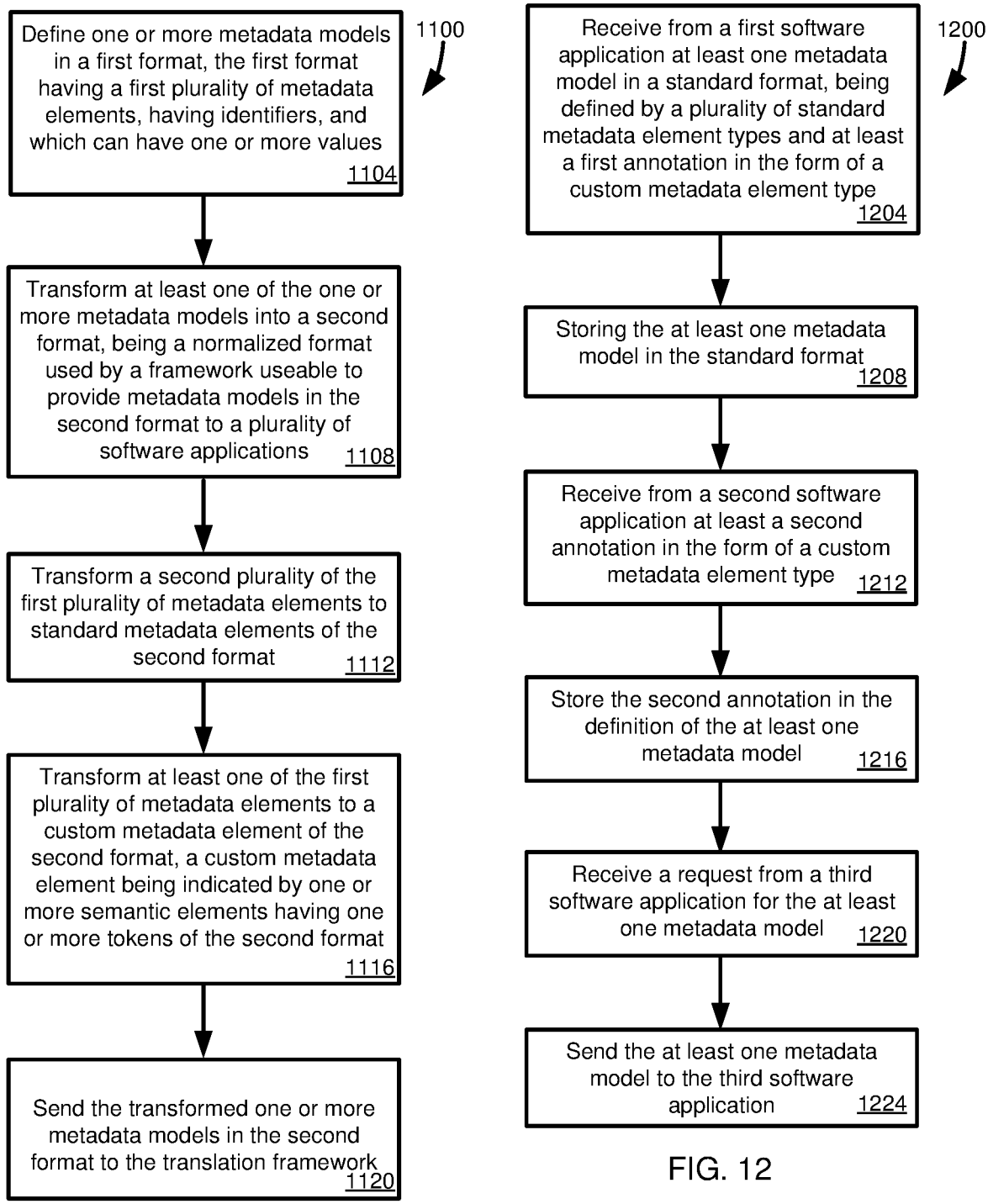

UNIFIED METADATA MODEL TRANSLATION FRAMEWORK

FIELD

The present disclosure generally relates to transferring data between software applications. Particular implementations relate to translating metadata defining a metadata model between different formats used by the different software applications.

BACKGROUND

Software applications often apply formatting to data, or associate metadata with underlying data. The metadata can specify the formatting, and can specify technical or semantic features, of the data. For example, a technical feature might be that the data is an integer, float, string, etc. A semantic feature might be that the data represent an address, a telephone number, or an employee number.

Software applications are typically programmed to work with data having a particular format or schema (which can also be referred to as a data model), such as a format or schema specifying particular metadata included in the schema and an organization of the metadata. Software applications from different vendors will often use different data formatting, and may include different data or metadata. Thus, software from different vendors may be incompatible, at least unless significant effort is made to convert data between formats. Even for related software, such as software from the same vendor, data formats can differ between products or product versions. In particular, improvements or changes to a version of a first software program may result in the loss of compatibility with a second software program. Additionally, having software that rigidly accepts a particular data format or particular metadata can limit an end user's ability to extend or customize the software. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for transferring metadata between software applications. A translation framework stores metadata models in a standard format. Source applications can cause metadata to be stored in the translation framework in the standard format. A target application can receive metadata from the translation framework, which metadata can be optionally converted from the standard format to a target format used by the target application. The translation framework can store annotations to a metadata model in the form of custom metadata types. The custom metadata types can be used by one or both of the target application and a source application. Source applications can cause values to be stored for annotations they support. Target applications can read values for annotations they support. Source applications and target applications do not write or read, respectively, unsupported annotations.

In one embodiment, a method is provided for transforming at least one metadata model between formats. One or more metadata models are defined in a first format. The first format includes a first plurality of metadata elements. Each metadata element has an identifier, and can be associated with one or more values. In some cases, a metadata element identifier can itself be used as a value (e.g., the presence or absence of the metadata element can be used to take/not take a particular action). At least one of the one or more metadata models is transformed into a second format. The second format is a standardized format used by a translation framework. The translation framework is useable to provide metadata models in the second format to a plurality of software applications, optionally including the first software application.

The transforming can include transforming a second plurality of the first plurality of metadata elements to standard metadata elements of the second format. The transforming can further include transforming at least one of the first plurality of metadata elements to a custom metadata element of the second format. A custom metadata element is indicated as such using one or more semantic elements, where a semantic element includes one or more tokens of the second format. The transformed one or more metadata models in the second format are sent to the translation framework. The translation framework is accessible to a plurality of software applications, which can include the first software application and at least a second software application. The at least a second software application is not configured to receive the at least one metadata model in the first format. For example, the second software application may not be able to process metadata elements while the at least one metadata model is in the first format.

In a further aspect, a method is provided for applying annotations to at least one metadata model in a standard format. At least one metadata model in a standard format is received from a first software application. The at least one metadata model is defined by a plurality of standard metadata element types and at least a first annotation in the form of a custom metadata element type. The at least one metadata model is stored in the standard format. At least a second annotation in the form of a custom metadata element type is received from a second software application. The at least the second annotation is stored in the definition of the at least one metadata model. A request is received from a third software application, which can be the first software application or the second software application, for one or more metadata element types of the at least one metadata model. The one or more metadata elements types of at least one metadata model in the standard format are sent to the third software application in response to the request.

Another method provides for retrieving a metadata model in a standard format from a translation framework. A first request is received for one or more metadata values associated with one or more metadata fields of at least one metadata model. A second request for the at least one metadata model is sent to a translation framework. The at least one metadata model is received from the translation framework in a standard format. The at least one metadata model includes a first plurality of metadata types, and corresponding values, in a hierarchical structure. A second plurality of the first plurality of metadata types are standard metadata types. At least one of the first plurality of metadata types is a custom metadata type. A custom metadata type is indicated in the standard format using one or more semantic elements, where a semantic element includes one or more tokens of the standard format. At least a portion of information defined in the at least one metadata model is displayed to a user.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 8 is a diagram illustrating example metadata models having a hierarchical relationship.

FIG. 9 is a diagram illustrating an example data model.

FIG. 10 is a diagram illustrating another example data model.

FIG. 11 is a flowchart of a method of converting a metadata model to a standard format and sending metadata elements of the metadata model in the standard format to a translation framework.

FIG. 12 is a flowchart of a method of annotating a metadata model in a standard format with annotations from first and second software applications.

DETAILED DESCRIPTION

Example 1—Overview

Figure 1:
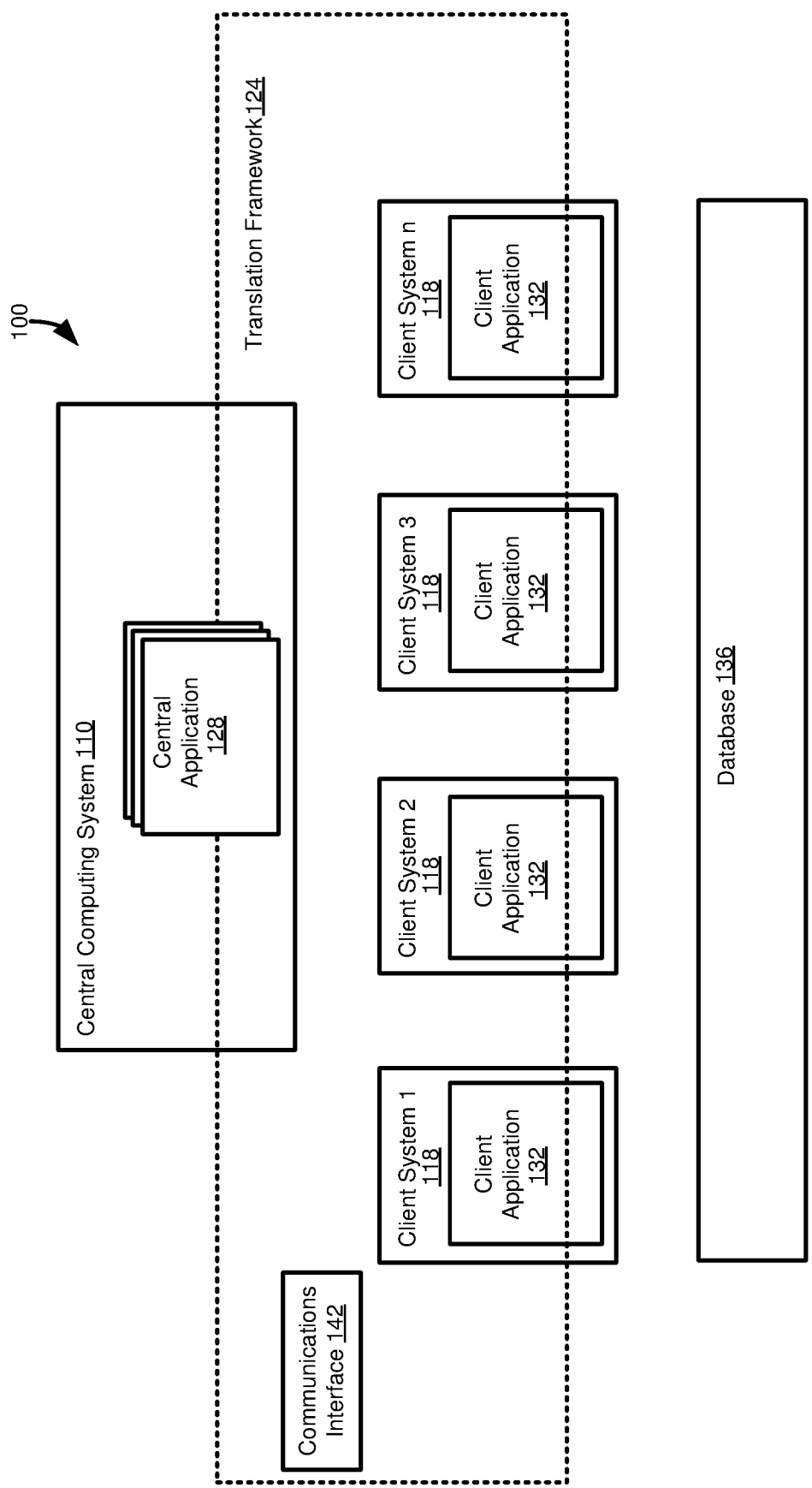
FIG. 1 is a block diagram illustrating a computing environment, according to an embodiment of the disclosed technologies, having a central application and multiple remote applications, where a translation framework facilitates sharing metadata elements among the central application and the remote applications in different metadata model formats.

Software applications often apply formatting to data, or associate metadata with underlying data. The metadata can specify the formatting, and can specify technical or semantic features, of the data. For example, a technical feature might be that the data is an integer, float, string, etc. A semantic feature might be that the data represent an address, a telephone number, or an employee number.

Software applications are typically programmed to work with data having a particular format or schema, such as a format or schema specifying particular metadata included in the schema and an organization of the metadata. Software applications from different vendors will often use different data formatting, and may include different data or metadata. Thus, software from different vendors may be incompatible, at least unless significant effort is made to convert data between formats. Even for related software, such as software from the same vendor, data formats can differ between products or product versions. In particular, improvements or changes to a version of a first software program may result in the loss of compatibility with a second software program. Additionally, having software that rigidly accepts a particular data format or particular metadata can limit an end user's ability to extend or customize the software. Accordingly, room for improvement exists.

The present disclosure provides a framework that can be used to interconvert data between formats. In particular, the data can be metadata, such as in the form of metadata elements for a particular metadata model arranged in a particular format. In some cases, a metadata model can store one or more data elements in addition to metadata elements. However, in other cases, the metadata model only stores metadata elements. Metadata elements can optionally store information indicating one or more data sources where data that can be described by the metadata elements can be retrieved.

As an example of how data and metadata can be related, in some cases, data elements can be actual values associated with an analog world object, such as a telephone number, address, and name associated with a user. The data can be associated with metadata that describes the data, describes how the data should be manipulated, or defines other properties of the data. For instance, the telephone number may be associated with technical metadata specifying that the telephone number is an integer, and may be associated with semantic metadata specifying that the value represents a telephone number.

Metadata can also specify how values should be processed or transformed, or checked for validity or other issues. Continuing the example of a telephone number, metadata can specify that the value should be a ten-digit number. Metadata can specify that the value should be expressed as XXX-XXX-XXXX, where X is an integer of the value. Metadata can specify that the value should be transformed into a different format or type, such as being converted from an integer to a string. As another example, metadata can specify a particular JOIN type (inner, left outer, right outer, full) to be used with a particular data object (e.g., a collection of data elements such as a table in a relational database, or an abstract data type that can be mapped to one or more tables of a relational database), or element(s) thereof.

Metadata can be associated with a schema, which can specify particular metadata elements, and, optionally, one or more data elements, that are required (or in some cases, optional) in a particular collection. For instance, the metadata schema can specify particular metadata elements or data elements that are expected for a particular data model, and can also specify particular metadata values for all or a portion of the metadata elements in the schema. In some cases, data elements can be included in the schema, which can be data values associated with, or to be used with, a particular instance (or instances) of data that can be described by metadata of the schema. As discussed above, the metadata schema can include operations that should be performed on schema elements (either explicitly, or by reference, such as referencing an external procedure via an API, RPC, or URI). Such operations can be similar to methods of a class.

Disclosed technologies facilitate the conversion of metadata elements between formats, and optionally between metadata schemas. The metadata elements can be converted between a metadata format associated with a first, source, application, and a metadata format associated with a second, target application. In addition, or instead, of converting between formats, the metadata elements can be converted between metadata schemas. The converted metadata elements associated with the source application can be, at least in some cases, made available to multiple target applications. When multiple target applications receive metadata elements provided by a particular source application, the target applications can use the same format as one another, or they can use different formats. In some cases, the source application and one or more of the target applications can use the same metadata format (and/or metadata schema). That is, the disclosed technologies can provide a platform that facilitates the sharing of metadata between applications, regardless of the source and target metadata formats.

It should be noted that a given application may serve as a source application, a target application, or both, depending on the context. For example, when an application is to share its metadata with another application, or at least make its metadata available, it can be a source application. That same application can also use metadata from another application, in which case the source application also is a target application with respect to the another application.

One or both of the source or target metadata formats can be a serialized format, such as a XML or JSON representation of the data. The source or target metadata format can also be a data type, such as an abstract or composite data type, or an equivalent construct. The source or target metadata format is converted to an intermediate metadata format, which can be a generalized metadata format for use by a variety of target applications. Typically, the intermediate metadata format is a serialized format, such as XML or JSON.

In some cases, the intermediate metadata format is a metadata format that is directly useable by a target application. For example, the intermediate metadata format may be a serialized format having a metadata schema that is used by/recognized by the target application. Or, at least part of the intermediate metadata schema can be used by the target application, and the target application is able to exclude metadata schema elements that it is not configured to process. In other cases, the intermediate metadata format is converted to a metadata format useable by the target application. In yet further cases, the metadata schema can allow metadata element to be self-describing (e.g., the metadata schema can provide a name for a metadata type, describe a data type for a value for the metadata type, etc., where a metadata schema (or model) includes values for metadata types or for data members of the metadata schema, which data members can be described in a similar manner as the metadata types).

As will be described, the intermediate metadata format can be incorporated into a "passive" framework or adapter that is available to source and target applications. Source applications can be configured to write metadata elements into the intermediate metadata format. Target applications can be configured to read metadata elements from the intermediate metadata format. The intermediate metadata format can support metadata schema elements that are not supported by one or more of the target applications, one or more of the source applications, or a combination thereof.

Target applications can retrieve information that they are able to support, which can be more or less information than may have been written by a source application. If a target application reads less information than is currently available, the target application may, at a later date, be updated to use additional information without requiring a change in the intermediate metadata format or in the source application. Similarly, the same framework and intermediate metadata format can be used by different target applications, able to read different amounts of the intermediate metadata format, without requiring a change in the intermediate metadata format or in the source application. Similarly, the intermediate metadata format can support receiving greater or lesser amounts of metadata schema elements from source applications. Thus, source applications are able to write whatever metadata elements they are configured to support, and target applications are able to read whatever metadata elements they are configured to support. As a source or target application is updated, it may write or read additional metadata elements to or from the intermediate metadata format without affecting the intermediate metadata format or other source or target applications. Similarly, source or target applications can incorporate custom metadata schema elements without impacting other applications that are not currently configured to support those custom metadata schema elements.

The disclosed technologies can provide a variety of advantages and improvements. For example, the disclosed technologies can facilitate data sharing and intercommunication between software applications, including software applications executing on different computing devices or systems. The disclosed technologies can reduce programming effort in facilitating communications between applications, as a single framework is able to dynamically adapt to changing schemas of source and target applications. The disclosed technologies also can facilitate the improvement and customization of software applications, as for example, the intermediate format allows a source application to write all desired data without concern whether any or all target applications can support particular data. Similarly, target applications can be written to provide functionality for changes or additions without concern whether any or all source applications currently support such changes or additions.

Example 2—Example Computing Environment

FIG. 1 is a block diagram illustrating an example computing environment 100 in which disclosed technologies can be implemented. In the computing environment 100, a central or common computing system 110 may act as a server in communication with a plurality of client, or remote, computing systems or devices 118. The central system 110 and the client systems 118 can communicate using any suitable method. In a particular example, the central system 110 is a cloud platform, and the client systems 118 are clients of the cloud platform. For example, the client systems 118 may use software programs that are made available on the central system. Typically, at least some of the client system 118 are connected to the central system 110 over a network connection, such as a TCP/IP connection or using another networking protocol.

The central system 110 and the client systems 118 can communicate through a translation framework or adapter 124. In particular implementations, the translation framework 124 can be provided by the central system 110. However, in other cases, the translation framework 124 can be provided by a computing system or device other than the central system 110. In this scenario, the central system 110 and the client systems 118 access the translation framework 124. However, the central system 110 and the client systems 118 can optionally be in communication in other manners, such as directly, even if they can also communicate via the translation framework 124. Similarly, when the framework 124 is provided by the central system 110, the central system and the client systems 118 may communicate in ways in addition to/other than through the translation framework.

The central system 110 can have one or more central applications 128. The one or more central applications 128 can act as source applications, target applications, or both, with respect to the translation framework 124, other client applications, and applications 132 of the client systems 118. Similarly, the client applications 132 can act as source applications, target applications, or both, with respect to the translation framework 124, other client applications, and central applications 128. In particular embodiments, central applications 128 may also communicate with one another via the translation framework 124, client applications 132 can communicate with one another through the framework, or both.

The computing environment 100 can include additional components, which can be accessed by one or both of the central system 110 and the client systems 118. For example, a database 136 can be available for access by the central system 110, one or more of the client systems 118, or both.

The translation framework 124 can be in communication with the central system 110 and the client systems 118 using any suitable method. In a particular example, the central system 110, or other computing systems devices acting as target systems, request data from the framework 124 using the HTTP protocol. Other, or additional, protocols can be used, such as using the OData protocol in combination with HTTP. Similarly, one of the client systems 118, or another system acting as a source system, can send data to the translation framework 124 using HTTP/OData. Other protocols or mechanisms for sending or receiving data may be used as desired. In addition, not all systems need use the same protocol, including having source and target systems use different protocols, different source systems using different protocols, or different target systems using different protocols.

Example 3—Example Metadata Formats with Extensions

Figure 2:
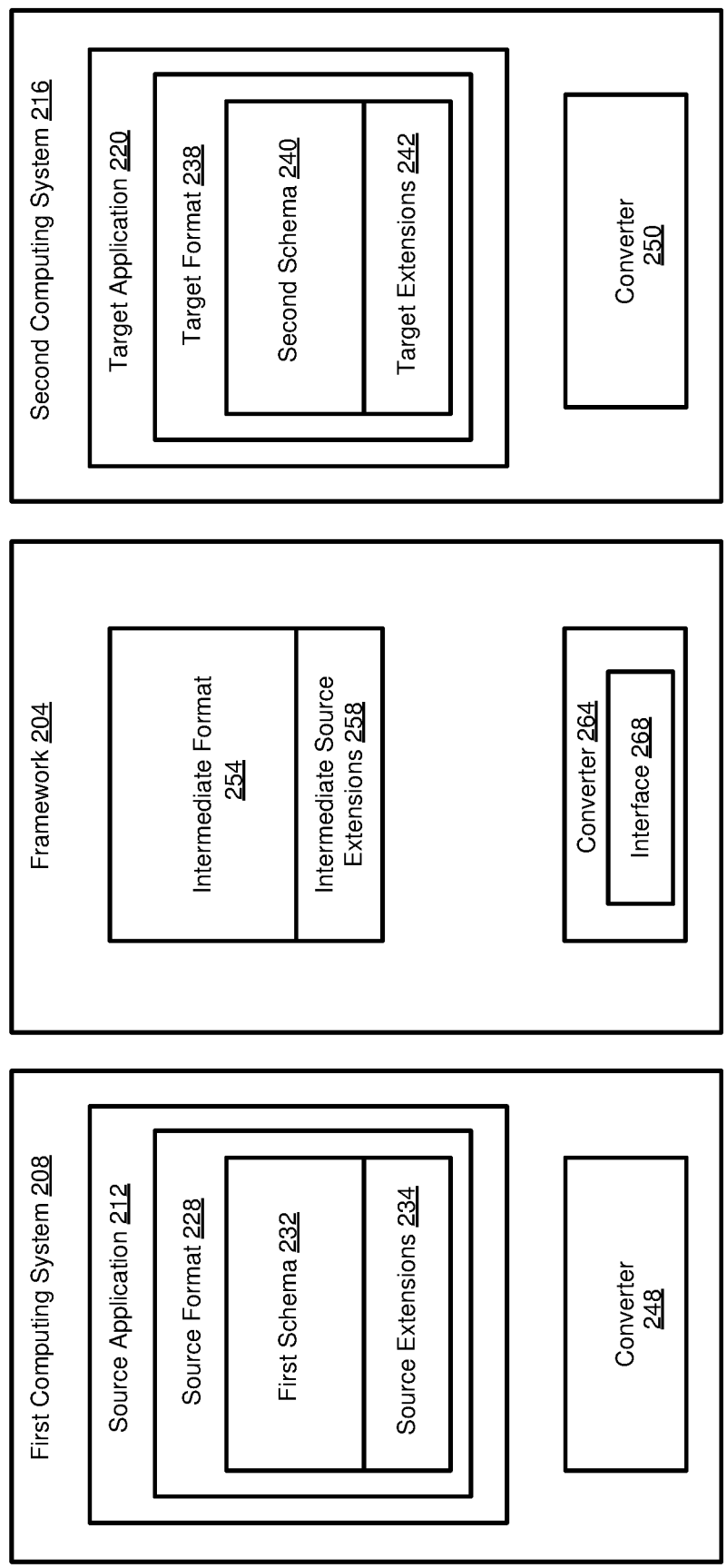
FIG. 2 is a block diagram of a computing environment in which disclosed technologies can be implemented, showing how a translation framework can provide an intermediate metadata model format that can be translated between source and target formats.

FIG. 2 illustrates how a source application 212 of a first computing system 208 and a target application 220 of a second computing system 216 can communicate via a framework 204. The source application 212 can store metadata in a first, source metadata format 228. The source metadata format 228 can store metadata for a first schema 232. The source format 228 can optionally include source metadata extensions or customizations 234. The source metadata extensions or customizations 234 can be metadata schema elements that are not part of the first metadata schema 232, where the first metadata schema is used by other source applications, the framework 204, or target applications, including the target application 220. In some cases, the source application 212 does not include source metadata extensions 234.

The target application 220 can store metadata in a second, target metadata format 238, including having metadata elements for a second metadata schema 240 (which, in some cases, can overlap, or be equivalent to, the first metadata schema 232). The target metadata format 238 can optionally include target metadata extensions or customizations 242, which can be metadata schema elements that are not part of the target metadata format, where the target metadata format is used by other target applications, the framework 204, or source applications, including the source application 212. In some cases, the target application 220 does not include target metadata extensions 242.

The first computing system 208 and the second computing system 216 can include respective converters 248, 250. The converters 248, 250 can convert the source metadata format 228, and optionally source metadata extensions 234, or the target metadata format 238, and optionally the target metadata extensions 242, to or from an intermediate metadata format 254. The intermediate metadata format 254 can include any source metadata extensions 234 or target metadata extensions 242 provided by the source application 212, the target application 220, or other source or target applications. That is, in at least some cases, the intermediate metadata format 254 serves as a repository of extensions from multiple applications, which applications may be source applications, target applications, or combinations thereof. The source metadata extensions 234 can be stored as intermediate source metadata extensions 258. The intermediate source metadata extensions 258 can be maintained in a different format or schema than in the parent source application 212 or target application 220.

In at least some implementations, there can be overlap between source metadata extensions 234 and target metadata extensions 242. In this case, the target application 220 can access intermediate source metadata extensions 258 that overlap with the target metadata extensions 242. The target application 220 can ignore, or not receive, intermediate source metadata extensions 258 that do not overlap with the target metadata extensions 242. Or, the target application 220 is otherwise able to "ignore" unsupported intermediate source metadata extensions 258. Similarly, the source application 212 is able to write intermediate source metadata extensions 258 that are not included in the target metadata extensions 242. The target application 220 can include target metadata extensions 242 that are not, at least at a particular time, included in the intermediate source metadata extensions 258 (e.g., no source application yet writes corresponding target metadata extensions 242). However, the target metadata extensions 242 allow for functionality to be provided for the target application 220, even if some or all source applications 212 do not, at least currently, support the target metadata extensions.

In some cases, a converter 264 can be included in the framework 204. The converter 264 can convert from the source metadata format 228 (including any source metadata extensions 234) to the intermediate metadata format 254, or to intermediate source metadata extensions 258. The converter 264 can convert from the intermediate metadata format 254, and the intermediate source metadata extensions 258, to the target metadata format 238 and the target metadata extensions 242. The converter 264 can include an interface 268 that can be called by the source application 212 or the target application 220 to send or receive information to/from the interface. In a particular example, the interface 268 is provided as an API, where metadata to be converted can be provided as an argument or attachment (e.g., in the form of one or more files that can be read and converted by the converter 264).

Example 4—Example Architecture for Converting Between Metadata Formats

Figure 3:
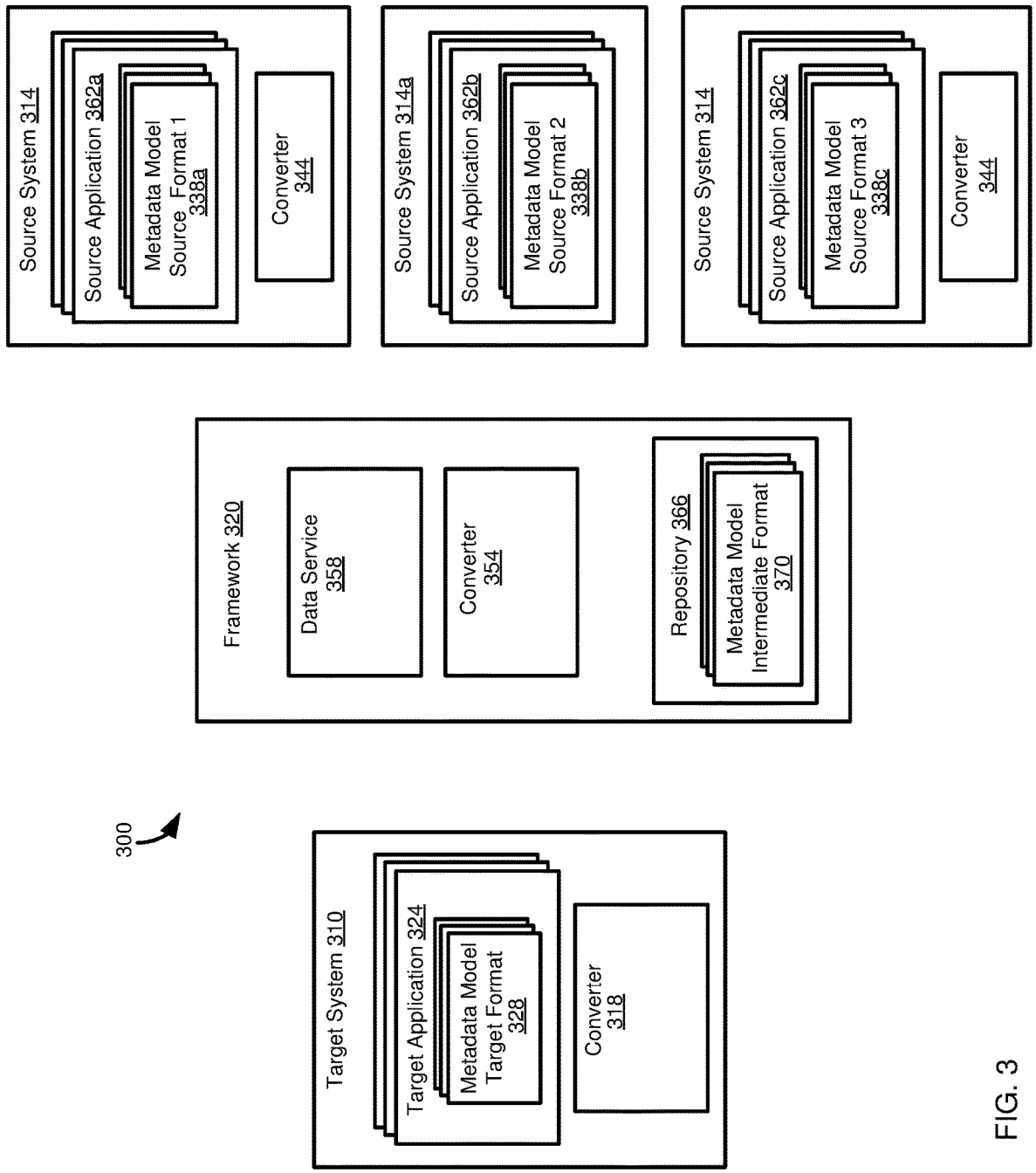
FIG. 3 is a block diagram illustrating how converters associated with an adapter framework or an application computing system can convert metadata elements between an intermediate format used by the adapter and formats used by applications of the application computing systems.

FIG. 3 illustrates a computing environment 300 in which disclosed technologies can be implemented. In particular, the computing environment 300 illustrates how different source metadata formats can be made available in a particular target metadata format using aspects of the disclosed technologies.

The computing environment 300 includes a target system 310 and a plurality of source systems 314. The target system 310 can be a central system that is accessible to the source systems 314, such as providing software or software functions to the source systems, or optionally other systems. The target system 310 can include a converter 318 for converting metadata elements from a framework 320 (and in a particular metadata model) to a metadata format useable by a target application 324 of the target system. The target application 324 can then use the converted metadata elements (in a metadata model format) to process, and in at least some cases retrieve, data that can be described by the metadata elements. The converter 318 can be omitted in some circumstances, as further described below.

In some cases, the metadata format can be expressed as a data type, such as an abstract or composite data type, and the metadata can be stored as values of data members of the data type. In some cases, the converted metadata elements can be used to create or populate methods associated with the data type. In further embodiments, rather than being stored in a data type, the metadata elements can be stored in another manner, such as being stored as a file, or being stored in a serialized format, such as a JSON object or an XML document. In yet further embodiments, the metadata elements can be stored in a database, such as in one or more tables of a relational database, or can be stored in a tabular format in another manner. The metadata elements can be stored in a desired data structure, such as a stack, vector, array, queue, heap, list, graph, or tree. The stored metadata elements can be used to describe one or more data objects or other collection of data elements.

The source systems 314 can store metadata elements 338a-338c in respective first, second, and third metadata formats. In some cases, one or more of the source metadata formats can be the same, or at least related. In other cases, at least one source system 314 stores metadata elements 338 in a metadata format that is not the same as, or related to, the metadata format of another of the source systems. The metadata formats generally can be as described for the metadata format 328 of the target application 324.

In a particular example, two metadata formats are "related" if the metadata formats overlap, such as one format having more, fewer, or different metadata elements than the other metadata format, but the metadata formats have some metadata elements in common (e.g., the metadata elements serve the same purpose or have the same semantic or meaning), and the formatting or notation for the metadata element is common (e.g., they both use similar tokens, syntax elements, etc.). In at least some cases, two metadata formats are not "related" simply because they are in the same overall format, such as both being in XML or JSON format.

One or more of the source systems 314 can include a converter 344. The converter 344 can be used to convert a respective metadata element 338a-338c to a metadata format useable by the framework 320. One or more of the source systems, such as system 314a, can omit a converter 344. As further described below, the framework 320 can include a converter 354 that can receive and convert metadata elements from the sources system 314a to a metadata format used by the framework (and, optionally, can convert from the metadata format used by the framework to one or more other metadata formats). If a converter 354 is included, then all of the source systems 314 may omit a converter 344, if desired. Similarly, if a converter 354 is not included, then all of the source system 314 may include a converter 344.

The framework 320 can include a metadata service 358. The metadata service 358 can process requests for metadata from the target application 324. In a particular implementation, the metadata service 358 process requests using a protocol such as HTTP, which can use additional protocols, such as OData. However, the metadata service 358 can use other, or additional, protocols. In some cases, the metadata service 358 can be configured to receive requests for metadata, or other services (e.g., to write metadata), in multiple protocols. Configuring the metadata service 358 to use different protocols can be useful, for instance, when the target application 324 and source applications 362 of the source systems 314 do not all support a common protocol.

The framework 320 can include a repository 366 that stores a plurality of metadata models 370 in an intermediate format. The repository 366 can be an in-memory structure, a persisted structure (e.g., saved to disk), or combinations thereof. For example, a portion of metadata models 370, such as frequently used data elements, can be stored in memory (e.g., cached), while less frequently used data elements can be persisted. Or, the entire repository 366 can be stored in memory, but can be backed up in persistent storage.

When the target application 324 requests metadata elements, such as metadata elements associated with a particular schema, the corresponding metadata models 370 can be located in the repository 366 and all or a portion of the metadata elements in the schema returned. Any conversion of the metadata models 370 can be carried out by the converter 318 or the converter 354, depending on the implementation. The request, and metadata elements to be returned, can be mediated by the metadata service 358. For example, the metadata service 358 can parse the request, determine the metadata models 370 to be retrieved, optionally call the converter 354, and return the, optionally converted, metadata elements to the target application 324 in response to the request. The metadata models 370, when received by the target system 310, can be stored and used by the target application 324, optionally after being converted by the converter 318.

Source applications 362 can cause metadata elements to be stored in the repository 366 in a similar manner as the target application 324 receives metadata elements. The source applications 362 can store metadata models 338, which can be in respective first, second, and third metadata formats. In at least certain implementations, two or more of the first, second, third metadata formats differ from one another. Of course, a greater or fewer number of source applications 362 could be used, in which general case the source metadata formats can all be the same, can all be different, or at least some of the source systems can use a common metadata format. However, a benefit of the disclosed technologies is that the converters 344 of the respective source applications 362 can write metadata to the repository 366 in the form of a metadata model 370 having the intermediate format. That is, to illustrate, source application 362*a* can store a metadata model 338*a* in a first format, source application 362*b* can store a metadata model 338*b* in a second format, and source application 362*c* can store a metadata model 338*c* in a third format, where the first, second, and third metadata formats are different, but have metadata elements that provide common semantics. As explained above, in some cases, a "different" metadata format can be one where the metadata formats are incompatible, and in other cases a "different" metadata format can be one where some portions are compatible, and others are not, such as one source system having extensions to a base metadata format that are not supported by another of the systems.

A source application 362 can send a request to the framework 320 to store a metadata element in the repository 366 as a metadata element of a metadata model 370. The request can be handled by the data service 358. Prior to be being sent to the data service 358 in a request, the metadata model 370, or element thereof, can be converted by the converter 344 of the respective source application 362. Or, the data service 358 can call the converter 354 of the framework 320 prior to causing the metadata model or metadata element to be stored in the repository 366 as, or in, a metadata model 370. The data service 358 can also determine whether the received metadata model 370 or metadata element is in a condition to be stored, such as being compliant with an intermediate format used by (or for) metadata models 370 in the repository. If the metadata model or metadata element is not compliant, it can optionally be converted to the intermediate format, if supported and possible, or an error can be returned in response to the request.

Example 5—Example Request for Metadata Elements in Translation Framework

Figure 4:
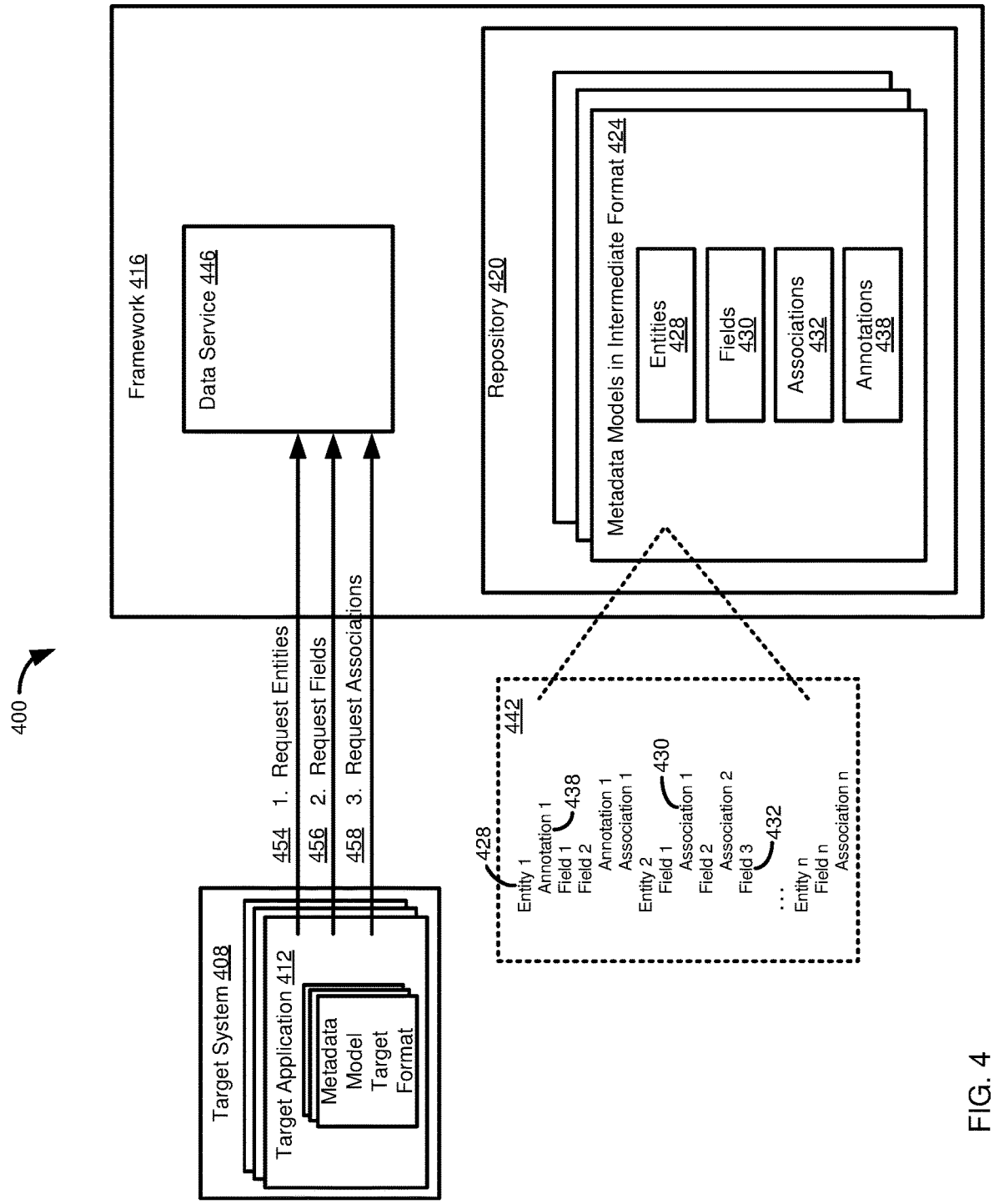
FIG. 4 is a schematic diagram illustrating how a software application can sequentially request metadata elements from an adapter framework.

FIG. 4 illustrates a computing environment 400 in which disclosed technologies can be implemented. In particular, FIG. 4 illustrates how a target computer system 408 having a target application 412 can request metadata from a framework or adapter 416.

The framework 416 includes a repository 420, which can be, or at least be generally similar to, the repository 366 of FIG. 3. The repository 420 can store one or more metadata models 424 in an intermediate format. The metadata models 424 can be stored as discrete objects (e.g., a single JSON or XML file for each model), as a collection of objects (e.g., a single JSON or XML file can define multiple models), or a combination thereof (e.g., some objects store discrete models, others store collections).

As shown, the metadata models 424 include information regarding various metadata elements, including entities 428, fields 430, and associations 432. The entities 428, fields 430, and associations 432 can correspond to relational database tables, or can be mapped or otherwise associated with corresponding elements of database tables. For instance, the entities 428 can be various tables, the fields 430 can be particular columns or attributes of the table (or entity), and the associations 432 can be relationships between a particular metadata model 424 and one or more other metadata schemas or between elements in a particular metadata model (e.g., specifying a relationship between different fields of different entities). In a particular example, an association 432 can represent a foreign key relationship or other technical or semantic association with another metadata model 424, such as between one or more fields 430 of a first metadata model and one or more fields of a second metadata model.

A metadata model 424 can include additional, fewer, or different types of information than shown. The metadata models 424 in the repository 420 can have the same structure and format (e.g., particular data and metadata fields or elements, with values differing for different metadata models), or metadata models 424 in the repository 420 can have different structures and formats (or schemas).

At least a portion of the metadata models 424 can include one or more annotations 438. Annotations 438 can be additional information describing an aspect of a metadata model 424, such as additional information relating to an entity 428, a field 430, or an association 432, or can be an additional type of information related to the metadata schema, or an element thereof. The annotations 438 can represent optional information in a metadata model 424. Source applications (not shown in FIG. 4) can write annotations 438 if they are supported. The target application 412 can optionally receive all or a portion of the annotations 438, if they are supported. In this way, the framework 416 can facilitate sharing of information contained in a metadata model 424 between source applications and the target application 412 (or other target applications), including providing the ability for the target application to optionally receive any annotations 438 that it might support, and which are provided by one or more source applications.

Although the entities 428, fields 430, and associations 432 are shown in separate elements of the repository 420, the corresponding data can be structured in another manner, such as in the manner shown in schema 442. In the schema 442, a number of entities 428 are shown with fields 430 and associations 432 for a particular entity being included in a hierarchical format with the entity. That is, the fields 430 can be subelements (e.g., child nodes) of an entity 428. The associations 432, in a particular example, can be subelements of the fields 430.

The target application 412 can request all of a portion of metadata associated with one or more metadata models 424 of the repository 420. The request can be serviced by a data service 446 of the framework 416. In some cases, the request can be for the entirety of one or more metadata models 424, such as a metadata schema associated with a particular identifier or a metadata model having particular properties (e.g., a metadata model with entity value of "XYZ", where the data service 446 can search for metadata model meeting particular search criteria). Among other properties, one or more metadata models 424 can be associated with a particular semantic identifier, such as a domain or a package, where a domain or package indicates metadata models having a common semantic or functional relationship.

In other cases, including as shown, the target application 412 can sequentially request metadata for particular metadata elements for one or more of the metadata models 424 (including, as described above, metadata schemas meeting search criteria or having a particular semantic or functional relationship). Allowing the target application 412 to specify particular metadata elements to retrieve can improve responsiveness of the target application, as, for example, a user request for metadata can be satisfied more quickly if a smaller amount of metadata need be transferred. Similarly, transferring selected information can reduce metadata transmission, thus conserving network resources, by reducing the transfer of unneeded metadata.

As shown, the target application 412 can make a first request 454 for entities 428 associated with the repository 420, or with one or more particular metadata models 424 of the repository. The target application 412 can then make a second request 456 for fields 430 associated with the repository 420, such as fields associated with all or a portion of the entities 428 received in the request 454. The target application 412 make a third request 458 for associations 432 associated with the repository 420, such as for all or a portion of fields 430 associated with all or a portion of the entities 428 received in the request 456 or the request 454.

Requests for other information in the repository 420, such as for annotations 438, can be retrieved in a similar manner. Or, the annotations 438 can be sent with a metadata element they annotate, such as by sending an annotation with an entity 428, field 430, or association 432 that is annotated. Annotations 438 can be implemented as child nodes, or otherwise hierarchically relating to an annotated schema element.

Although a variety of implementations can be used for the requests 454, 456, 458, in a particular example, the requests are HTTP GET requests, including using the OData protocol. The response can be provided as a response to the GET request. Although the source applications are not shown in FIG. 4, source applications can store metadata model 424 in the repository 420 using the data service 446, such as by issuing a POST request, including using the OData protocol.

When the target application 412 receives all or a portion of a metadata model 424, the target application can take various actions, including displaying all or a portion of metadata for the metadata model to a user. As another example, the target application 412 can create a runtime object (such as an instance of a class or other abstract or composite data type, or instantiating data in a data structure) based on information received for one or more metadata models 424.

Example 6—Example Mapping Between Data Model Formats

Figure 5:
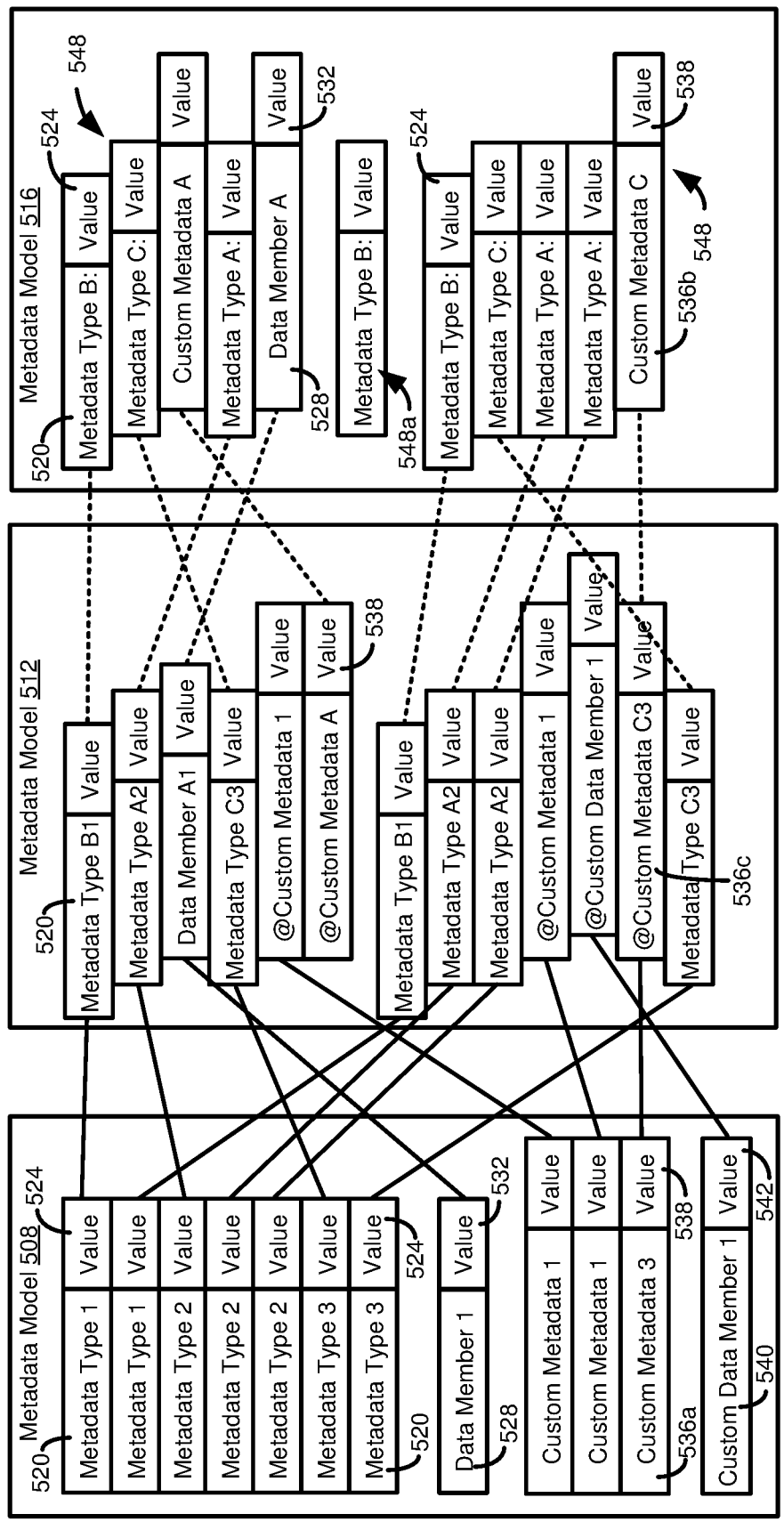
FIG. 5 is a schematic diagram illustrating how metadata elements, including metadata types and values, can be mapped between different metadata model formats.

FIG. 5 illustrates three different metadata formats 508, 512, 516 that can be used to stored information regarding one or more metadata schema. That is, the metadata formats 508, 512, 516 can be used to describe one or more common metadata elements (and in some cases, data elements), but the way in which the common metadata elements (and optionally data elements) are described may differ, and the particular details that are described may differ between the formats. For example, even with metadata formats 508, 512, 516 having identical metadata elements, the metadata elements can be structured differently between the formats, different syntax elements or tokens can be used, etc. In some cases, metadata elements can differ between formats.

Metadata formats 508, 512, 516 include a plurality of metadata types 520, which can be associated with corresponding values 524. The metadata formats 508, 512, 516 also include a plurality of data members 528, which can be associated with corresponding values 532. In at least some cases, a metadata schema can omit a value 524, 532 for a corresponding metadata type 520 or data member 528. The metadata types 520 and the data members 528 can represent standard metadata types and data members for a particular metadata format. The metadata formats 508, 512, 516 can include one or more custom metadata types 536, with corresponding values 538, and one or more custom data members 540, with corresponding values 542. However, a particular metadata format 508, 512, 516 can omit custom metadata types 536, custom data members 540, or both, for one or more, or all, elements associated with another metadata format.

The metadata format 508 sets forth its constituent elements in a particular format. For instance, the metadata types 520 can be defined in a group separately from the data members 528, which are also defined in a group. The custom metadata types 538 and custom data members 540 can be similarly defined in their own respective groups.

The metadata format 512 can represent a standardized data format between which at least a portion of metadata from the metadata format 508 and the metadata format 516 can be interconverted. The intermediate metadata format 512 can have a different format than the metadata formats 508 and 516, can use different labels for metadata types or data members, and can include different custom metadata types or data members than the metadata format 508, 516. For example, the metadata format 512 has metadata elements segregated by top-level metadata objects 548 in a hierarchy, rather than segregating information by classification or type (e.g., metadata, data member, custom metadata, custom data member) as in metadata format 508. In addition, the names of the metadata types, data members, custom metadata types, and custom data members differ between the metadata formats 508, 512. The components of the metadata format 508 are shown as mapped (e.g., via the solid lines) to corresponding components of the metadata format 512. That is, for instance, metadata type 1 of the metadata format 508 is mapped to metadata type B1 of metadata format 512, metadata type 2 is mapped to metadata type A2, and so on.

Mapping between metadata formats can be expressed as a series of rules, which can be implemented programmatically. The rules can include the insertion or removal of formatting and syntax elements to convert between formats. When an element of a metadata format exists in a target format (such as the intermediate or normalized format), such elements (e.g., metadata elements or data elements) in the target format can be located and updated based on changes to the corresponding element in the source format. For instance, a particular element of a metadata schema in a metadata format can have an identifier, and, when the identifier is located in a target metadata model in a target format, a transformation component can determine whether values in the target format should be updated, changed, or removed. Updating the target format can include adding annotations or extensions that were added in a source application.

Rules can be more complex, if desired, including converting between data types or data formats used for particular elements of a metadata schema. A data type change could be, for example, changing an integer value in one data model to a string or float in another metadata schema. Another change could be changing a data source or data target for a particular metadata model, or a particular element of a particular metadata model. For instance, an element of a metadata schema might be retrieved from a first data store when used with metadata format 508, but retrieved from a second data store when used with metadata format 516. In some cases, a data source is associated with a system that serves as a source of a metadata model provided to a translation framework. Information regarding the data source, optionally including information sufficient to retrieve data from the data source (e.g., access pointers), can be included in the metadata model provided by the source of the metadata model.

The metadata format 516 can also have its components mapped to the metadata format 512 (as shown by the dashed lines), where the mapping can differ from the mapping used for interconverting the metadata format 508 and the metadata format 512. The metadata format 516 differs from the metadata format 508 in a number of ways, including being hierarchically organized for particular units (e.g., instances of a top level of hierarchical metadata elements) of a metadata format, like the metadata format 512. However, the structure of the unit of the metadata format 516 can be different than that used for the metadata format 512. It can be seen that the metadata format 516 includes an element 548a that does not have a counterpart in the metadata format 512 (and may not have one in the metadata schema 508 either). The element 548 can represent an element that is not being shared with another application, or another computing system or device.

The metadata format 512 can include custom metadata elements from the metadata format 508 and from the metadata format 516. Not all of the custom metadata elements from the metadata format 508 are present in the metadata format 516, however, and vice versa. While the metadata format 512 can include all custom elements (or, at least those custom elements which a source application has chosen to make available in a normalized, or standard, format), not all of those custom elements need be mapped to each of the metadata formats 508, 516. As an example of how custom metadata types can be mapped between the metadata formats 508, 512, 516, metadata format 508 has a custom metadata type 3, 536a, that corresponds to custom metadata type C, 536b, of metadata format 516. Each of the custom metadata types 536a, 536b can be mapped to a common custom metadata type 536c of the metadata format 512.

Custom metadata elements can include features that identify them as such, at least in the standardized format 512. For example, the custom metadata elements can be associated with a particular tokens or syntax elements that identify the metadata element as being custom. In the example of FIG. 5, custom metadata elements are indicated by preceding the name of the element with the "@" symbol. Annotating custom metadata elements as such can be useful, as it can signal to other applications, such as a target application, that the annotation is optional, so the other application can ignore the annotation if the annotation is not supported.

It should be noted that the example of FIG. 5 is relatively simply, in the metadata formats, and elements thereof, are shown as independent. In at least some cases, metadata formats (e.g., models or schema defined in the particular format) and elements thereof can themselves reference other metadata schema or elements of such other schema (which can be in the same or different formats), including being in a hierarchical relationship with other metadata schema (or particular elements of particular metadata schema), as further described in Examples 7 and 8.

Example 7—Example Hierarchical Metadata Models Related by a Standardized Model of a Translation Framework As described in Example 6, in some cases, metadata models can have a hierarchical relationship. Source and target applications or systems may support some or all metadata models in the hierarchy. In some implementations, an application or system will support metadata models at a particular level from a root level, and any levels in between, as well as the root level, but may not support metadata models at lower levels of the hierarchy (e.g., further from the root level). In some cases, lower levels of the hierarchy can express more detailed or granular semantics than higher levels in the hierarchy. So, for example, models that share a root level of the hierarchy, or higher hierarchical levels, share some common semantics, but may not express lower levels semantics, or may differ in how lower level semantics are expressed.

Figure 6:
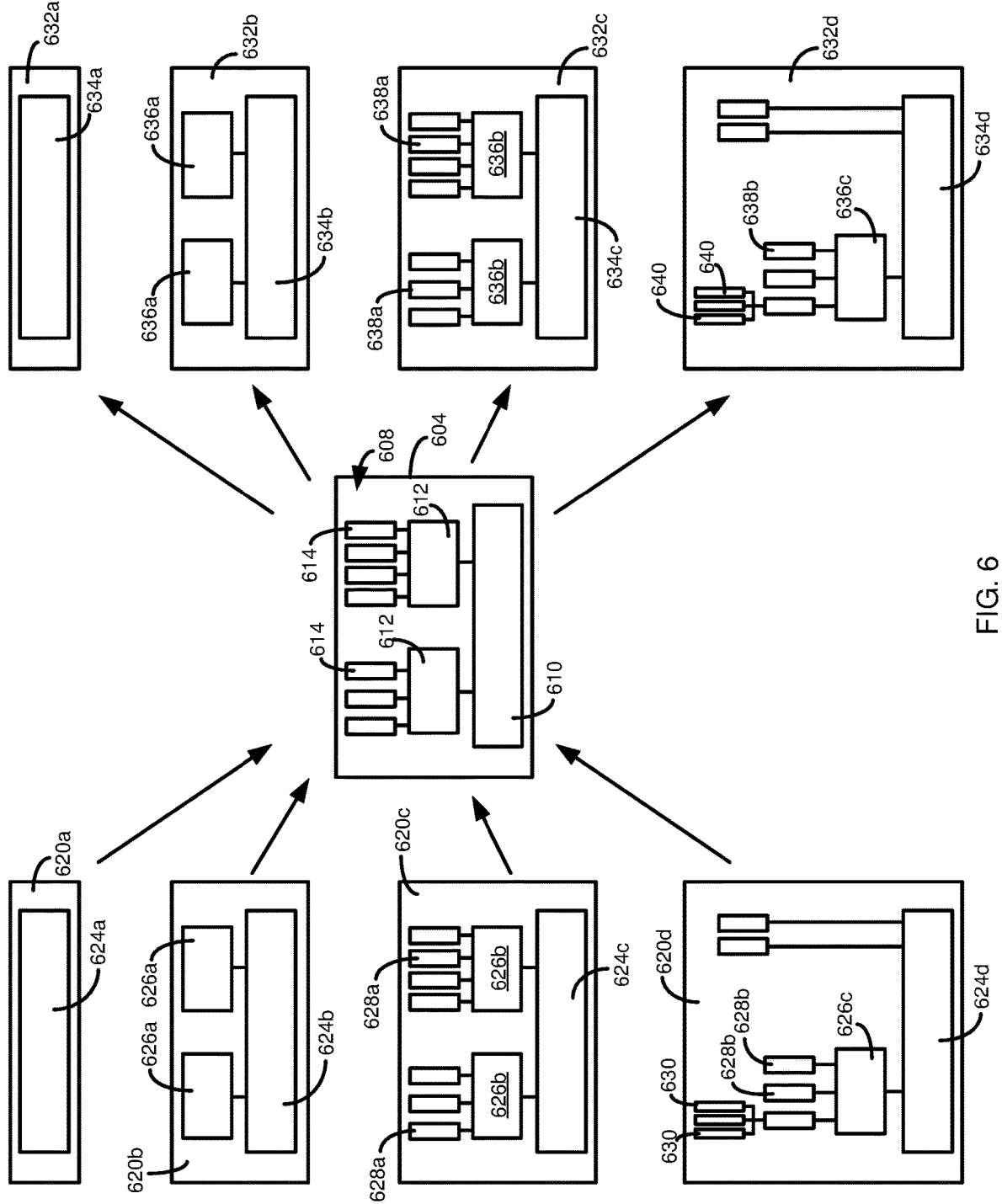
FIG. 6 is a diagram illustrating a metadata model in different metadata model formats.

FIG. 6 illustrates how different source and target systems may share some common hierarchical levels, and differ in others, and how a translation framework can provide a standardized model for at least some levels of the hierarchy. In particular, FIG. 6 illustrates a translation framework 604 that supports a standardized model 608 that includes three hierarchical levels 610, 612, 614. The three hierarchical levels can be represented, in at least some cases, in a single unified model (e.g., the model itself can have a hierarchical structure, where sub-models can be represented by appropriate levels and identifiers within the hierarchical structure of metadata elements in the unified model).

The hierarchical levels can be dependent on one another. For example, the lowest hierarchical level 614 may reference metadata elements of the intermediate hierarchical level 612. Similarly, the intermediate hierarchical level 612 (and, thus, also the lowest hierarchical level 614) may reference metadata elements of the hierarchical level 610, which can serve as a root hierarchical level. As described in the preceding examples, any of the hierarchical levels 610, 612, 614 may optionally include optional metadata elements or data elements, all or a portion of which (including, in some cases, none) can be included in the standardized model 608 or a metadata model of a source of target system. Typically, a hierarchical level of the standardized model 608 will include particular, required metadata elements.

Without limiting the present disclosure to any particular metadata model or metadata or data elements, and by way of example, the hierarchical levels of the standardized metadata model 608 can correspond to, respectively, an entity relation model as the model 610, an analytical model 612, and an analytic query 614, as used in products available from SAP SE of Walldorf, Germany. An entity relation model 610 can, for example, provide entities, such as in the form of relational database tables, and relationships between the tables, such as in the form of foreign key relationships or other associations between the tables. The analytical model 612 can provide additional semantics for the entity relation model 610, such as defining certain table attributes as facts or measures and other table attributes as dimensions. In turn, a model for an analytic query 614 can define particular data that should be retrieved from an analytic model 612 (which, again, in turn references an entity relation model 610), and optionally other features, such as calculations (e.g., aggregations or other operations) that should be performed on a referenced analytic model 612.

Note that the models of the standardized model 608 can be, in a sense, independent of any underlying data. That is, data from various sources can be interpreted using metadata provided by a model of the standardized model 608. For instance, the analytical model 612 can define data from a particular entity of the entity relation model 610 as a fact or a dimension, regardless of the actual data values maintained in a data source (e.g., a particular table) mapped to the standardized model 608 (or a corresponding model, including a model corresponding to a particular level of the standardized model) of a source system or a target system.

FIG. 6 illustrates examples of a plurality of source systems 620a, 620b, 620c, 620d, collectively source systems 620. The source systems 620 can use one or more of the hierarchical levels of the standardized metadata model 608. However, as described in the preceding examples, the metadata models of the source system 620 that correspond to levels of the standardized model 608 can be in a different format (or use a different schema or other model definition), and can include the same, more, or fewer metadata elements or data elements than an otherwise corresponding hierarchical level of the metadata model 608.

As shown in FIG. 6, the source system 620a includes only a level 624a corresponding to the root metadata model 610 of the standardized model 608. The source system 620b includes a level 624b corresponding to the root metadata model 610 of the standardized model 608, as well as a level 626a corresponding to the intermediate level 612 of the standardized model. The source system 620c includes a level 624c corresponding to the root metadata level 610, a level 626b corresponding to the intermediate level 612, and a level 628a corresponding to the lowest hierarchical level 614 of the standardized model 608. The source system 620d includes a level corresponding to the root metadata level 610, a level 626c corresponding to the intermediate level 612, a level 628b corresponding to the lowest level 614 of the standardized model 608, and an additional metadata model level 630 that does not have a counterpart in the standardized model 608. For example, the metadata model 630 can represent a view of an analytic query represented by the level 628b. In general, a metadata model of a source system 620 can include additional hierarchical levels that are not present in the standardized model 608, or metadata elements or data elements that are not present in the standardized model.

FIG. 6 illustrates examples of a plurality of target systems 632a, 632b, 632c, 632d, collectively target systems 632. The target systems 632 can use one or more of the hierarchical levels of the standardized metadata model 608. However, as described in the preceding examples, the metadata models of a target system 632 that correspond to levels of the standardized model 608 can be in a different format (or use a different schema or other model definition), and can include the same, more, or fewer metadata elements or data elements than an otherwise corresponding hierarchical level of the metadata model 608.

As shown in FIG. 6, the target system 632a includes only a level 636a corresponding to the root metadata model 610 of the standardized model 608. The target system 632b includes a level 636b corresponding to the root metadata model 610 of the standardized model 608, as well as a level 638a corresponding to the intermediate level 612 of the standardized model. The target system 632c includes a level 636c corresponding to the root metadata level 610, a level 638b corresponding to the intermediate level 612, and a level 640a corresponding to the lowest hierarchical level 614 of the standardized model 608. The target system 632d includes a level 634d corresponding to the root metadata level 610, a level 636c corresponding to the intermediate level 612, a level 638b corresponding to the lowest level of the standardized model 608, and an additional metadata model level 640 that does not have a counterpart in the standardized model 608. For example, the metadata model 640 can represent a view of an analytic query represented by the level 638b. In general, a metadata model of a target system 632 can include additional hierarchical levels that are not present in the standardized model 608, or metadata elements or data elements that are not present in the standardized model.

Example 8—Example Hierarchical Metadata Models

Figure 7:
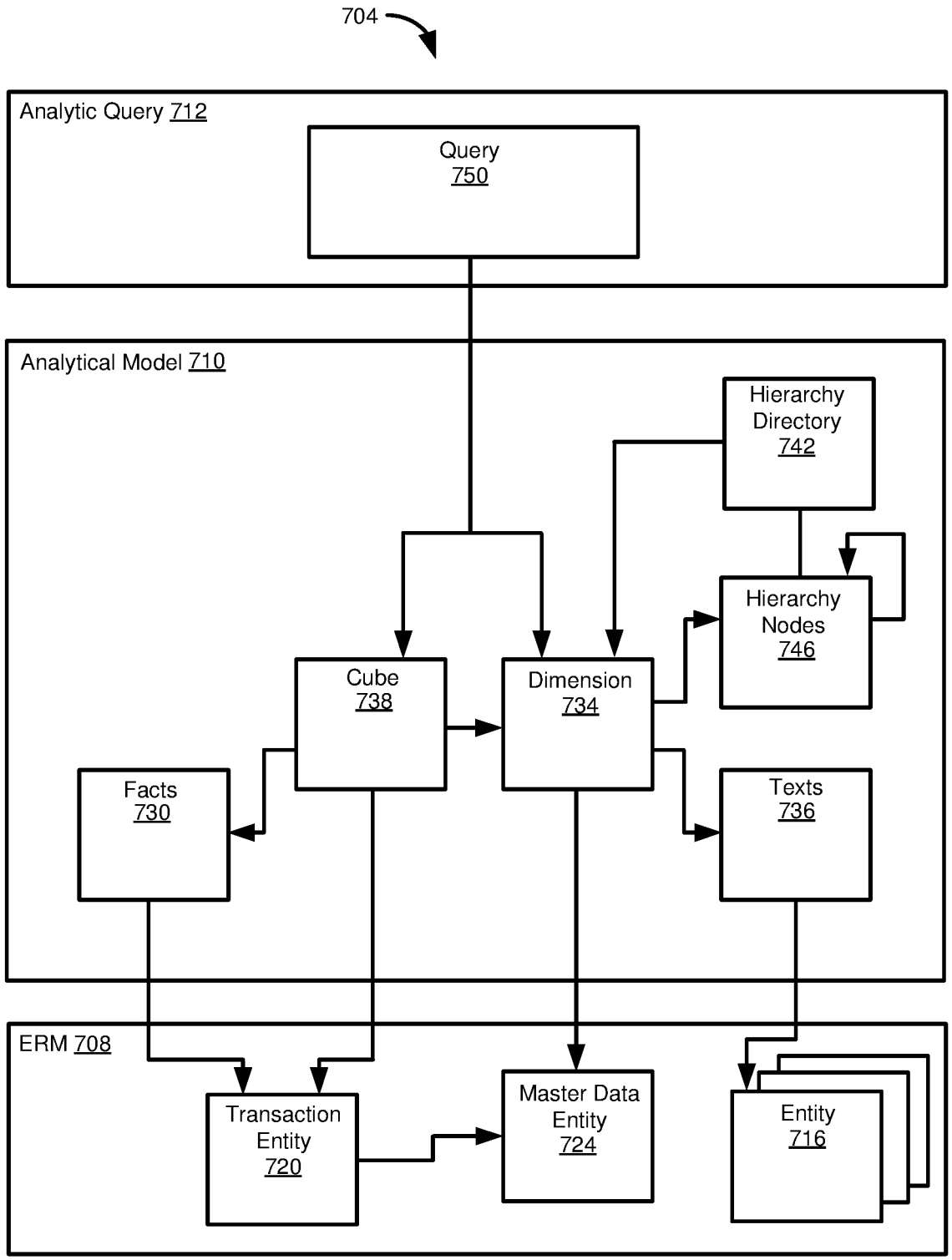
FIG. 7 is a diagram illustrating a hierarchical metadata model of a translation framework that can be used with source and target metadata models having the same or different hierarchical metadata models.

FIG. 7 provides an example of hierarchical data models and illustrates how lower hierarchical levels can depend on root or upper levels in the hierarchy, but add more detailed or expressive semantic information. FIG. 7 illustrates a root level 708 of a hierarchy 704 that can be an entity relation model, an intermediate level 710 that can represent an analytical model, and a lowest level 712 that can represent an analytic query. The levels 708, 710, 712 can correspond to metadata models used in products available from SAP SE of Walldorf, Germany.

The root level 708 can include a plurality of entities 716, such as tables in a relational database. The root level 708 can include one or more transaction entities 720 (a single transaction entity is shown). A transaction entity 720 can be a validation check, calculation, or other action that occurs upon the occurrence of a particular condition or trigger event, such as a user or another computer process entering a new instance of a transaction or, in some cases, modifying a prior transaction. The transaction may be a transaction that includes data that is to be stored in one or more of the entities 716.

The root level 708 can further include one or more master data entities 724 (a single master data entity is shown). A master data entity 724 can define particular categories or types of data objects, including providing values, such as default values, defining valid values (such as for a transaction entity 720 that references a master data entity), or providing semantics that can be used to interpret data, such as data in a transaction entity or data in an entity 716.

The analytic model provided by the intermediate layer 710 can include semantics that characterize elements of a transaction entity 720 as facts (e.g., for an OLAP analysis) 730, including a particular type of fact (e.g., applying a sematic label to an element of the transaction entity) and characterize elements of a master data entity 724 as dimensions 734. The dimensions 734 can be described by, and have identification attributes specified by, texts 736. The facts 730 and dimensions 734 can be used to form a data cube (e.g., an OLAP cube) 738 that can be used to organize and analyze data.

The dimensions 734 can also be referenced by a hierarchy directory 742, which applies a particular hierarchical structure to the dimensions, providing hierarchy nodes 746 corresponding to dimensions organized in a particular manner. Different hierarchical arrangements can be specified by different hierarchical structures specified in the hierarchy directory 742. That is, for different analysis or visualization purposes, different selections and organizations of the dimensions 734 may be used.

The lowest level of the hierarchy 712, providing an analytic query 750, can request data from the cube 738 and the dimensions 734. In addition to requesting data, the analytic query can apply additional semantics to the requested data, calculate additional data, or apply other operations, such as aggregating or filtering data.

It can be seen that each level of the hierarchy 704 can use or reference higher (the root level or closer to root level) level data models and, at the same time, can add additional semantics to underlying data (or data calculated therefrom). However, a particular level of the hierarchy 704 could be used in different ways, other than as shown. For example, the root level 708 could be used by an analytical model having a different schema than that shown, or could be used by metadata models other than analytical models. As described in Example 7, a particular software application or computing system can support some of all of the levels in the hierarchy 704, and may maintain any supported levels in a different format, where a different format can be a different storage format (e.g., XML versus JSON), a different metadata structure (e.g., different organizations or labels for metadata elements), or both.

Example 9—Example Metadata Models

FIG. 8 illustrates example JSON listings for a metadata model ("Settlement Unit") in a first metadata format 808 and in a second metadata format 812. The first metadata format 808 can represent a normalized or standardized metadata format and the second metadata format 812 can represent a source metadata format. Rules can be defined to transform metadata elements from the second metadata format 812 to the first metadata format 808, and from the first metadata format to the second metadata format. In a particular example, transformations can be specified in the XSLT language, or using similar conversion techniques.

It can be seen that some metadata elements are defined for both metadata formats 808, 812, although the exact formatting of the metadata element may differ. For example, both metadata formats 808, 812 have a metadata element 816, "baseQuantityUnit," although it is formatted differently between the two metadata formats. That is, both the position and formatting of "baseQuantityUnit" are different (including surrounding tokens and syntax elements). The metadata format 808 includes metadata elements for the data element 816 that are not present in the metadata format 812, such as "length" and "type." Transformation rules can be defined to add, remove, or change metadata elements that are different between the metadata formats 808, 812. An example transformation rule can be "for "Settlement Unit," set length=3 and set type=cds.String.

FIG. 8 also illustrates that metadata formats 808, 812 can have different custom metadata elements, or annotations, or can have custom metadata elements or annotations in common. Both metadata formats 808, 812 include a custom metadata element 820 of "@Analytics.visible," with minor formatting differences between the two formats. As explained in Example 6, the "@" symbol can be used to identify a custom metadata element, or annotation. However, the metadata format 808 includes a number of custom metadata elements that are not included in the metadata format 812, such as the custom metadata element 824, "@cds.persistence.name": 'SETTLEMENTUNIT'." The custom metadata elements in metadata format 808 that are not present in metadata format 812 can represent custom metadata elements that are used in other metadata formats (or metadata models), and which would be available to the metadata format 808 if the metadata format 808 were updated to support such custom metadata elements. For instance, a transformation rule could be added to write the custom metadata element 824 to the metadata format 812.

FIGS. 9 and 10 illustrate further examples of metadata formats, such as metadata formats that are used as a source or target metadata format in conjunction with a standardized metadata format (e.g., a standardized metadata model in a standardized metadata format).

Example 10—Example Metadata Transformation and Annotation Operations

FIG. 11 is a flowchart of an example method 1100 of transforming at least one metadata model between metadata model formats. The method 1100 can be performed, in some examples, using a computing environment 100, 300, 400 of FIG. 1, FIG. 3, or FIG. 4, respectively. At 1104, one or more data models are defined in a first format. The first format includes a first plurality of metadata elements. Each metadata element has an identifier, and can be associated with one or more values. In some cases, a metadata element can itself be used as a value (e.g., the presence or absence of the metadata element can be used to take/not take a particular action). At least one of the one or more metadata models is transformed, at 1108, into a second format. The second format is a standardized format used by a translation framework. The translation framework is useable to provide metadata models in the second format to a plurality of software applications, optionally including the first software application.

The transforming can include, at 1112, transforming a second plurality of the first plurality of metadata elements to standard metadata types of the second format. The transforming can further include, at 1116, transforming at least one of the first plurality of metadata elements to a custom metadata element of the second format. A custom metadata element is indicated as such using one or more semantic elements, where a semantic element includes one or more tokens of the second format. At 1120, the transformed one or more metadata models in the second format are sent to the translation framework. The translation framework is accessible to a plurality of software applications, which can include the first software application and at least a second software application. The second software application is not configured to receive the at least one metadata model. For example, the second software application may not be able to process the metadata elements while the at least one metadata model is in the first format.

FIG. 12 is a flowchart of an example method 1200 of applying annotations to at least one metadata model in a standard format. The method 1200 can be performed, in some examples, using a computing environment 100, 300, 400 of FIG. 1, FIG. 3, or FIG. 4, respectively. At 1204, at least one metadata model in a standard format is received from a first software application. The at least one metadata model is defined by a plurality of standard metadata element types and at least a first annotation in the form of a custom metadata element type. The at least one metadata model is stored in the standard format at 1208. At 1212, at least a second annotation in the form of a custom metadata element type is received from a second software application. The at least the second annotation is stored, at 1216, in the definition of the at least one metadata model. At 1220, a request is received from a third software application, which can be the first software application or the second software application, for one or more metadata element types of the at least one metadata model. The one or more metadata element types of at least one metadata model in the standard format are sent to the third software application, at 1224, in response to the request.

Figure 13:
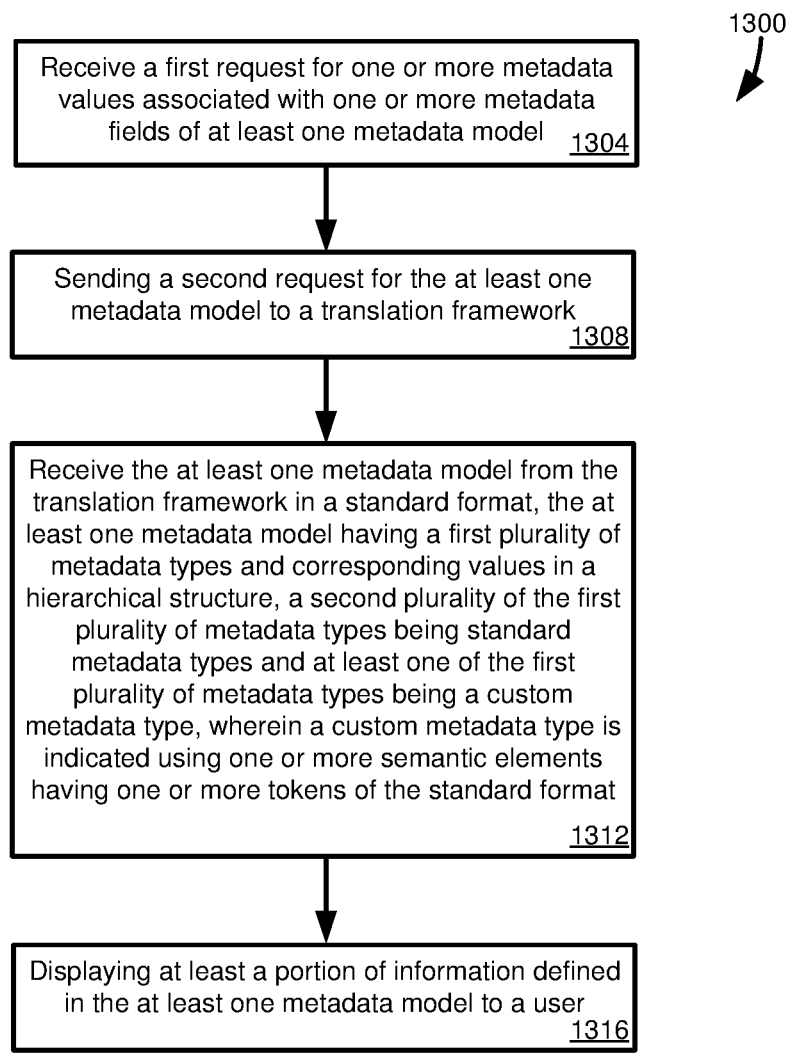
FIG. 13 is a flowchart of a method of requesting a metadata model in a standard format from a translation framework.

FIG. 13 is a flowchart of an example method 1300 of retrieving a metadata model in a standard format from a translation framework. The method 1300 can be performed, in some examples, using a computing environment 100, 300, 400 of FIG. 1, FIG. 3, or FIG. 4, respectively. At 1304, a first request is received for one or more metadata values associated with one or more metadata fields of at least one metadata model. A second request for the at least one metadata model is sent to a translation framework at 1308. At 1312, the at least one metadata model is received from the translation framework in a standard format.

The at least one metadata model includes a first plurality of metadata types, and corresponding values, in a hierarchical structure. A second plurality of the first plurality of metadata types are standard metadata types. At least one of the first plurality of metadata types is a custom metadata type. A custom metadata type is indicated in the standard format using one or more semantic elements, where a semantic element includes one or more tokens of the standard format. At least a portion of information defined in the at least one metadata model is displayed to a user at 1316.

Example 11—Computing Systems

Figure 14:
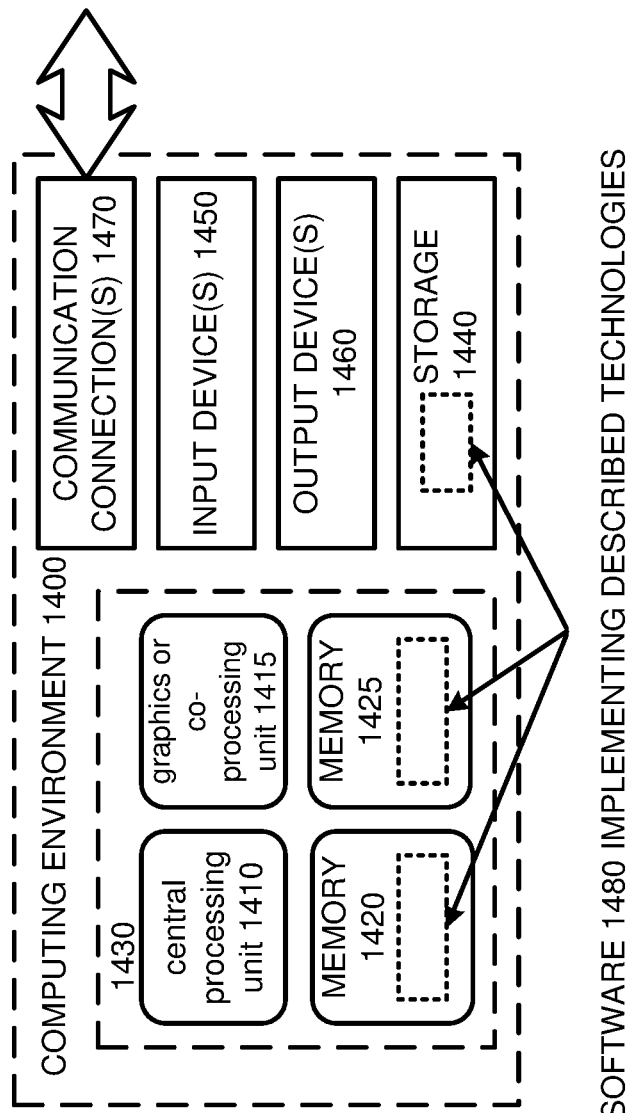
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing components of the computing environment 100 of FIG. 1, the computing environment 300 of FIG. 3, or the computing environment 400 of FIG. 4, including as described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 15:
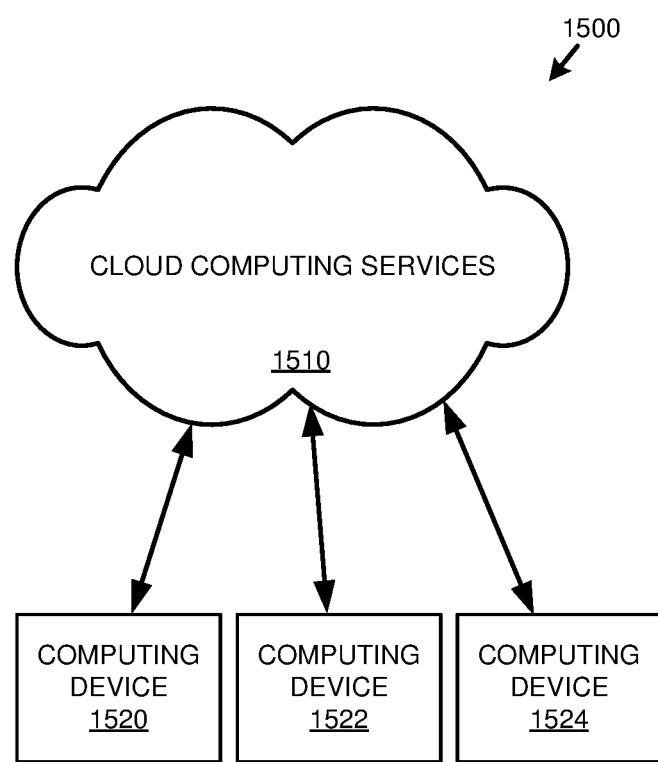
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising one or more processors and one or more memories coupled to the one or more processors, the one or more memories comprising computer-executable instructions for causing the computing system to perform operations comprising:

with a first software application, defining one or more metadata models in a first format, the first format comprising a first plurality of metadata elements, each metadata element having an identifier, wherein each metadata element can be associated with one or more values;

transforming at least one of the one or more metadata models into a second format to provide a transformed metadata model, the second format being a standard format used by a translation framework, the standard format being a common metadata model format for a plurality of software applications, the plurality of software applications comprising the first software application and at least a second software application, wherein the transforming comprises:

transforming one or more metadata elements of the first plurality of metadata elements to one or more standard metadata elements of the second format; and transforming at least one of the first plurality of metadata elements to a custom metadata element of the second format, wherein a custom metadata element indicates a metadata element of the second format that extends the standard format and may be used by software applications that support the custom metadata element but the custom metadata element is not useable by software applications that only support the standard format, and wherein the custom metadata element is indicated as a custom metadata element in the second format using one or more semantic elements comprising one or more tokens of the second format; and sending the transformed metadata model in the second format to the translation framework, wherein the translation framework is accessible to a plurality of software applications, the plurality of software applications comprising the first software application and at least a second software application, wherein the at least a second software application is not configured to receive data in the first format.

2. The method of claim 1, wherein the second format has hierarchically organized metadata types, and wherein the custom metadata element of the second format is associated with a particular hierarchical level.

3. The method of claim 1, wherein the standard metadata elements comprise metadata elements of an entity-relation model comprising entities and fields.

4. The method of claim 1, wherein the transforming is carried out by the first software application.

5. The method of claim 1, wherein the transforming is carried out by the translation framework.

6. The method of claim 1, wherein the transforming is carried out using a transformation template.

7. The method of claim 1, wherein the second format comprises a plurality of hierarchically related metadata models, and the first format corresponds to a model of the plurality of hierarchically related metadata models.

8. The method of claim 1, wherein the transformation comprises converting a value associated with a metadata element of the first plurality of metadata elements from a first data type used with the first format to a second data type used with the second format.

9. The method of claim 1, wherein the transformation comprises altering a data source referenced by a value of a metadata element of the first plurality of metadata elements of the first format.

10. The method of claim 1, wherein at least one metadata element of the first format specifies a data processing type to be used with a first metadata model of the one or more metadata models.

11. The method of claim 10, wherein the data processing type is a JOIN type.

12. The method of claim 1, wherein the transforming comprises adding one or more metadata elements in the second format that describe a metadata element of the first format.

13. A computing system comprising:
memory;
one or more processing units coupled to the memory; and
one or more non-transitory computer readable storage media storing instructions that, when executed, cause the computing system to perform operations comprising:
with a first software application, defining one or more metadata models in a first format, the first format comprising a first plurality of metadata elements, each metadata element having an identifier, wherein each metadata element can be associated with one or more values;
transforming at least one of the one or more metadata models into a second format to provide a transformed metadata model, the second format being a standard format used by a translation framework, the standard format being a common metadata model format for a plurality of software applications, the plurality of software applications comprising the first software application and at least a second software application, wherein the transforming comprises:
transforming one or more metadata elements of the first plurality of metadata elements to one or more standard metadata elements of the second format; and
transforming at least one of the first plurality of metadata elements to a custom metadata element of the second format, wherein a custom metadata element indicates a metadata element of the second format that extends the standard format and may be used by software applications that support the custom metadata element but the custom metadata element is not useable by software applications that only support the standard format, and wherein the custom metadata element is indicated as a custom metadata element in the second format using one or more semantic elements comprising one or more tokens of the second format; and
sending the transformed metadata model in the second format to the translation framework, wherein the translation framework is accessible to a plurality of software applications, the plurality of software applications comprising the first software application and at least a second software application, wherein the at least a second software application is not configured to receive data in the first format.

14. The computing system of claim 13, the operations further comprising:
receiving from the second software application at least a second annotation in the form of a custom metadata element type;
storing the at least a second annotation in a definition of the transformed metadata model;
receiving a request from a third software application, which can be the first software application or the second software application, for one or more metadata element types of the transformed metadata model; and
sending the one or more metadata element types of the transformed metadata model to the third software application in response to the request.

15. One or more non-transitory computer-readable storage media storing computer-executable instructions for causing a computing system to perform operations comprising:
with a first software application, defining one or more metadata models in a first format, the first format comprising a first plurality of metadata elements, each metadata element having an identifier, wherein each metadata element can be associated with one or more values;
transforming at least one of the one or more metadata models into a second format to provide a transformed metadata model, the second format being a standard format used by a translation framework, the standard format being a common metadata model format for a plurality of software applications, the plurality of software applications comprising the first software application and at least a second software application, wherein the transforming comprises:
transforming one or more metadata elements of the first plurality of metadata elements to one or more standard metadata elements of the second format; and
transforming at least one of the first plurality of metadata elements to a custom metadata element of the second format, wherein a custom metadata element indicates a metadata element of the second format that extends the standard format and may be used by software applications that support the custom metadata element but the custom metadata element is not useable by software applications that only support the standard format, and wherein the custom metadata element is indicated as a custom metadata element in the second format using one or more semantic elements comprising one or more tokens of the second format; and sending the transformed metadata model in the second format to the translation framework, wherein the translation framework is accessible to a plurality of software applications, the plurality of software applications comprising the first software application and at least a second software application, wherein the at least a second software application is not configured to receive data in the first format.

16. The one or more non-transitory computer-readable storage media of claim 15, the operations further comprising:

receiving a request from a third software application, which can be the second software application, for one or more metadata element types of the transformed metadata model;

determining that the custom metadata element of the second format is not supported by the third software application; and in response to determining that the custom metadata element is not supported by the third software application, not sending the custom metadata element to the third software application in response to the request.

17. The one or more non-transitory computer-readable storage media of claim 15, the operations further comprising:

receiving a request from a third software application, which can be the second software application, for one or more metadata element types of the transformed metadata model;

determining that the custom metadata element of the second format is supported by the third software application; and in response to determining that the custom metadata element is supported by the third software application, sending the custom metadata element to the third software application in response to the request.

18. The one or more non-transitory computer-readable storage media of claim 15, the operations further comprising:

receiving a request from a third software application, which can be the second software application, for one or more metadata element types of the transformed metadata model; and creating a runtime object based at least in part on the transformed metadata model, wherein the runtime object includes any custom metadata types supported by the third software application.

19. The one or more non-transitory computer-readable storage media of claim 15, the operations further comprising:

converting at least a portion of the transformed metadata model to a third format, wherein the third format is at least partially different than the standard format.

20. The one or more non-transitory computer-readable storage media of claim 15, wherein the transformed metadata model comprises one or more values for one or more data members, the operations further comprising:

storing at least a portion of the one or more values for the one or more data members in a runtime object generated at least in part for the transformed metadata model.

\* \* \* \* \*